United States Patent [19]

Wehr

[11] Patent Number: 5,186,010
[45] Date of Patent: * Feb. 16, 1993

[54] ABSORBENT-REFRIGERANT SOLUTION

[75] Inventor: Don H. Wehr, Conifer, Colo.

[73] Assignees: Darrel H. Williams; George A. Griffin, both of Wichita, Kans.

[*] Notice: The portion of the term of this patent subsequent to May 21, 2008 has been disclaimed.

[21] Appl. No.: 700,570

[22] Filed: May 15, 1991

Related U.S. Application Data

[63] Continuation of Ser. No. 061,668, Jun. 15, 1987, Pat. No. 5,016,445, which is a continuation-in-part of Ser. No. 882,166, Jul. 7, 1986, abandoned, which is a continuation of Ser. No. 804,179, Nov. 18, 1985, abandoned.

[51] Int. Cl.$^5$ ............................................. F25B 15/00
[52] U.S. Cl. ........................................ 62/112; 62/476; 252/69
[58] Field of Search ................. 61/102, 112, 114, 476, 61/497; 252/67, 68, 69

[56] References Cited

U.S. PATENT DOCUMENTS

| | | | |
|---|---|---|---|
| 1,734,278 | 11/1929 | Tandberg | 62/112 |
| 1,947,381 | 2/1934 | Connolly et al. | 62/112 |
| 1,967,871 | 7/1934 | Dantsizen | 252/68 |
| 3,081,605 | 3/1963 | Leonard, Jr. | 62/112 |
| 3,276,217 | 10/1966 | Bourne et al. | 62/112 |
| 4,018,694 | 4/1977 | Anderson | 252/69 |
| 4,315,411 | 2/1982 | Vardi et al. | 62/112 |
| 5,016,445 | 5/1991 | Wehr | 62/101 |

Primary Examiner—Albert J. Makay
Assistant Examiner—William C. Doerrler
Attorney, Agent, or Firm—John Wade Carpenter

[57] ABSTRACT

An absorbent-refrigerant solution containing a promoter which enhances the vapor absorbent properties of the absorbent-refrigerant. The promoter comprises titanium trifluoride and titanium tetrafluoride.

16 Claims, 5 Drawing Sheets

F/G. 2

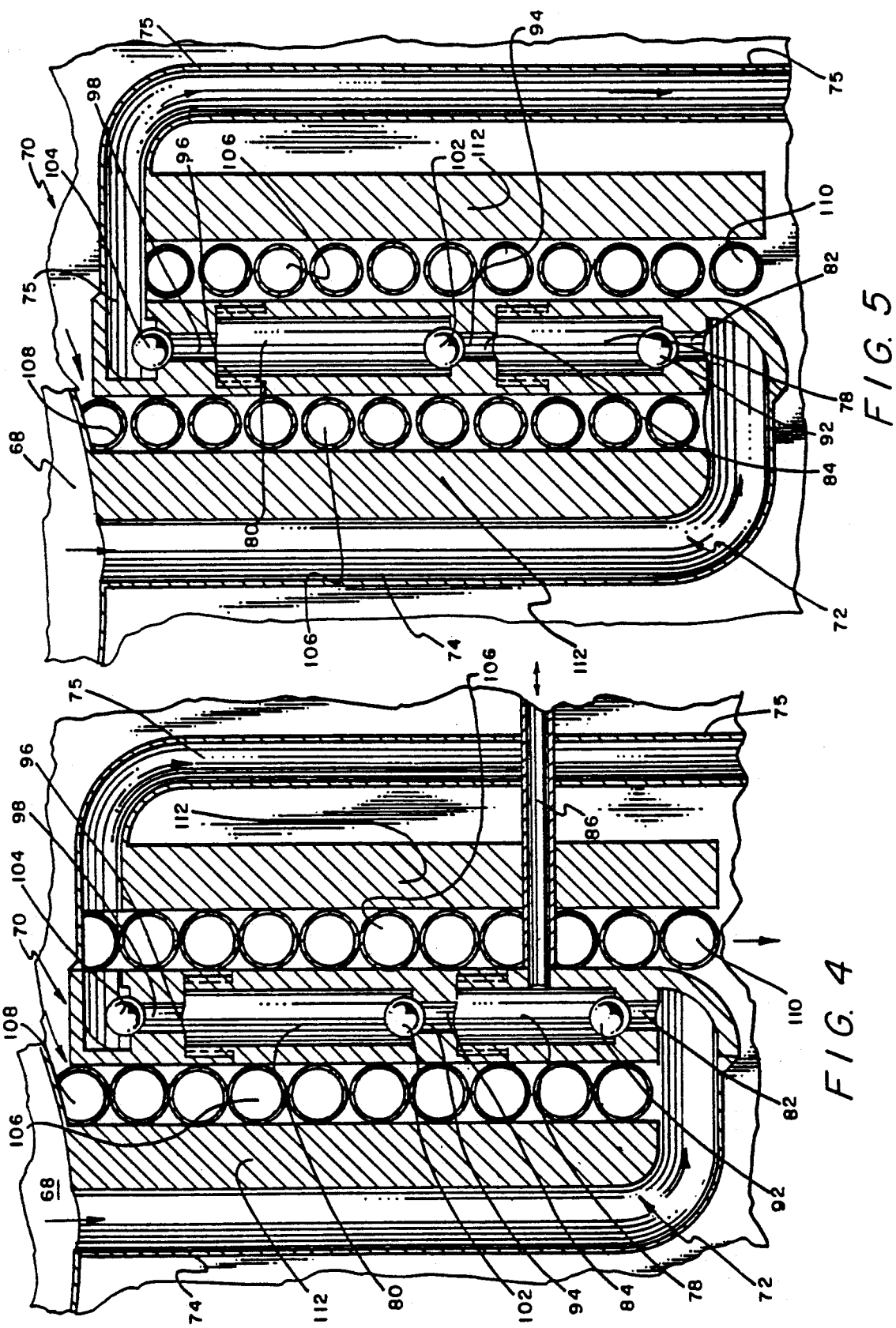

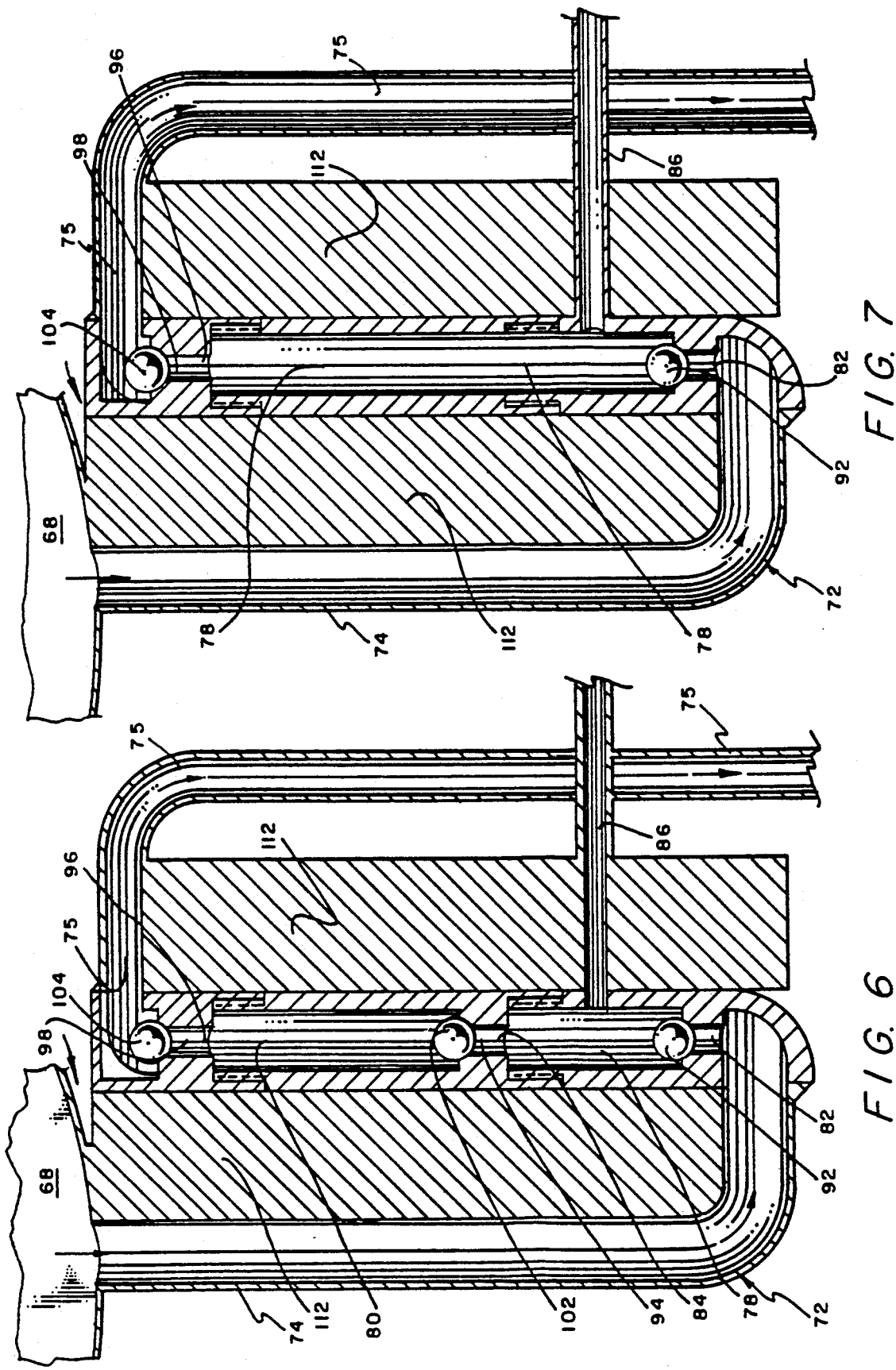

ABSORBENT-REFRIGERANT SOLUTION

BACKGROUND OF THE INVENTION

This a continuation application of co-pending application having Ser. No. 07/061,668, filed Jun. 15, 1987 now U.S. Pat. No. 5,016,445. Application having Ser. No. 07/061,668 was a continuation-in-part application of application having Ser. No. 882,166 and filed on Jul. 7, 1986, now abandoned. Application having Ser. No. 882,166 and filed on Jul. 7, 1986 was a continuation application of an application having Ser. No. 804,179 and filed on Nov. 18, 1985, now abandoned.

FIELD OF THE INVENTION

This invention is broadly related to an absorption apparatus, a method for producing a refrigerant effect, and to an absorbent-refrigerant solution. More specifically, this invention provides an air conditioner and/or refrigeration apparatus, a method for producing a refrigerant effect, and an absorbent-refrigerant solution. The absorbent-refrigerant solution includes a promoter for enhancing the vapor absorbent properties of the absorbent-refrigerant solution.

DESCRIPTION OF THE PRIOR ART

U.S. Pat. No. 4,179,895 by Shimokawa et al. discloses a cooling system which is solar operated. U.S. Pat. No. 4,028,078 to Peckham teaches a solar refrigeration system of the absorption type. U.S. Pat. No. 4,470,269 by Takemi et al. discloses an absorption refrigeration system driven by solar energy. U.S. Pat. No. 4,133,183 to Albertson illustrates a solar operated refrigeration system of the absorption type. U.S. Pat. No. 3,964,273 by Merrick teaches a compact absorption refrigeration apparatus. U.S. Pat. No. 4,462,222 to Sugimoto et al. discloses a dilute solution producing system of an absorption refrigerating apparatus. None of the foregoing prior art teaches or suggests the absorption apparatus and method of this invention. Furthermore, none of the foregoing prior art teaches or suggests the absorbent-refrigerant solution of this invention, nor the particular promoter for enhancing the vapor absorbent properties of the absorbent-refrigerant solution.

SUMMARY OF THE INVENTION

The present invention accomplishes its desired objects by providing in a broad aspect an absorption apparatus comprising an inner housing means, and an outer housing means totally enclosing the inner housing means. The inner housing means is generally totally enclosed and hermetically sealed to the ambient environment of the inner housing means. The outer housing means is also generally totally enclosed and hermetically sealed to the ambient atmosphere of the outer housing means. Stated alternatively, the outer housing means has an outer housing wall that totally surrounds and encloses an inner housing means including an inner housing wall and contains no open apertures wherethrough the inside of the outer housing means communicates with the atmosphere outside of the outer housing means. The inner housing means is also hermetically sealed to the ambient atmosphere of the outer housing by the outer housing means. An absorber means and an evaporator means are disposed in the inner housing means. A condensor means is disposed in the outer housing means. Also disposed in the outer housing means is a heat exchanger means, preferably such as a generator coil means. The absorption apparatus also broadly comprises a means (e.g. supports, brackets, or bars) interconnecting the inner housing means to the outer housing means, more specifically the inner housing wall to the outer housing wall, for supporting the inner housing means in a spaced relationship with respect to the outer housing means. The inner housing means is preferably essentially spherical in shape and the outer housing means is also generally spherical in shape. The spherical inner housing means and the spherical outer housing means are generally concentric with respect to each other. A means (e.g. a pump) is provided for flowing a refrigerant solution from the inner housing means to the outer housing means. Similarly, a means (e.g. a pump) is provided for flowing a refrigerant solution from the outer housing means to the absorber means disposed in the inner housing means. A heat exchanger means is disposed outside of the outer housing means for cooling the refrigerant solution flowing from the outer housing means to the absorber means and for heating the refrigerant solution flowing from the inner housing means to the outer housing means. The inner housing means, the outer housing means, the absorber means, the evaporator means, the condensor means, and the means interconnecting the inner housing means to the outer housing means, are all manufactured from stainless steel. Preferably, the stainless steel comprises an AISI type selected from the group consisting of 304, 304L, 316, 316L, 321, and 347.

The present invention also accomplishes its desired object by providing in another broad aspect a process for manufacturing an absorption apparatus comprising the steps of:

a) sealing hermetically an inner housing means from the ambient environment of the inner housing means;

b) disposing the inner housing means in an outer housing means; and c) sealing hermetically the outer housing means around the inner housing means such that the outer housing means and the inner housing means are hermetically sealed from the ambient atmosphere of the outer housing means.

The inner housing means and the outer housing means are generally spherical in shape, and the disposing step (b) is such that the inner housing means and the outer housing means are generally concentric with respect to each other. An absorber means and an evaporator means are disposed in the inner housing means prior to sealing hermetically in step (a). A condensor means is disposed in the outer housing means prior to sealing hermetically in step (c). A generator coil means is disposed in the outer housing means prior to sealing hermetically in step (c). As indicated, the absorber means, the evaporator means, the condensor means, the generator coil means, as well as the inner housing means and the outer housing means, are all manufactured from stainless steel.

The present invention further accomplishes its desired object by providing in yet another a broad aspect a promoter for enhancing the vapor absorbent properties of an absorbent-refrigerant solution. The promoter comprises a transition metal halide. More specifically, the transition metal halide is a Group IVa halide. Preferably, the halide is fluoride and the transition metal is titanium. More preferably, the transition metal halide is a compound selected from the group consisting of titanium trifluoride, titanium tetrafluoride and mixtures thereof. When the promoter is a mixture of titanium tetrafluoride and titanium trifluoride, the mixture comprises from about 10% by weight to about 90% by weight of titanium trifluoride and, correspondingly, from about 90% by weight to about 10% by weight of titanium tetrafluoride, with about 40% by weight and 60% by weight of the titanium tetrafluoride and titanium trifluoride, respectively, being the preferred. Stated alternatively, the mixture broadly comprises titanium trifluoride and titanium tetrafluoride in a ratio of from about 1:9 to about 9:1 by weight.

An absorbent-refrigerant solution is included within the present invention. The absorbent-refrigerant solution comprises a refrigerant compound and a transition metal halide. The refrigerant compound may be any suitable refrigerant compound but is preferably an alkali metal halide (e.g. lithium bromide). The absorbent-refrigerant solution additionally includes water. The mixing proportions of the components of the absorbent-refrigerant solution on a percent by weight bases are broadly as follows: from about 5% by weight to about 60% by weight of the alkali metal halide, from about 40% by weight to about 95% by weight of the water, and from about $10^{-8}$% by weight to about 0.10% by weight of the transition metal halide. The absorbent-refrigerant solution of this invention may additionally comprise a surface tension reducer (i.e. a surfactant), and an antifreezing agent, especially when below freezing temperatures are being produced by the absorption apparatus of this invention. When the absorbent-refrigerant solution includes an alkali metal halide, water, a transition metal halide, and a surfactant, the percent by weight bases of each component in the absorbent-refrigerant solution is as follows: from about 1% by weight to about 40% by weight of the alkali metal halide, from about 55% by weight to about 94% by weight of the water, from about $10^{-8}$% by weight to about 0.10% by weight of the transition metal halide, from about 0.1% by weight to about 5% by weight of the surfactant, and from about 0.1% by weight to about 5% by weight of the antifreezing agent.

The present invention also further accomplishes it desired objects by broadly providing an absorption apparatus comprising a housing, and an absorber means contained within the housing for producing a strong refrigerant solution. A generator refrigerant reservoir means is positioned within the housing for producing a rising refrigerant vapor means. A condensor means is situated within the housing for condensing the refrigerant vapor means into a refrigerant liquid means; and an evaporator means is disposed in the housing for receiving the refrigerant liquid means from the condensor means and vaporizing the same to create a refrigerant effect. The absorption apparatus also comprises a pump means for pumping the strong refrigerant solution means from the absorber means into the generator refrigerant reservoir means.

Another aspect of the present invention includes a process for producing a refrigerant effect by the following steps:

a) mixing an absorbent-refrigerant solution with a promoter that enhances the vapor absorbent properties of the absorbent-refrigerant solution to produce an absorbent-refrigerant mixture;
b) disposing the absorbent-refrigerant mixture of step (a) into a housing means;
c) evaporating at least a portion of the absorbent-refrigerant mixture into a refrigerant vapor leaving a residual absorbent-refrigerant mixture;
d) condensing the refrigerant vapor of step (c) into a refrigerant liquid; and
e) flowing the refrigerant liquid of step (d) into an evaporative zone wherein the refrigerant liquid evaporates into a refrigerant liquid evaporate to produce a refrigerant effect.

The refrigerant effect is also produced by a process comprising the steps of:

a) flowing a refrigerant vapor around a spherical inner housing;
b) condensing the refrigerant vapor of step (a) into a refrigerant liquid;
c) flowing the refrigerant liquid of step (b) into an evaporative zone wherein the refrigerant liquid evaporates to cool any evaporative coils that are in the evaporative zone;
d) absorbing the refrigerant liquid evaporate of step (c) into a condensed refrigerant solution and collecting the same in the bottom of the spherical inner housing;
e) pumping the condensed refrigerant solution of step (d) from the bottom of the spherical inner housing into the bottom of a spherical outer housing that houses the spherical inner housing wherein it may be vaporized into the refrigerant vapor of step (a).

Therefore, it is an object of the present invention to provide an absorption apparatus and a process for producing a refrigerant effect.

It is another object of the present invention to provide an absorbent-refrigerant solution and a promoter for enhancing the vapor absorbent properties of an absorbent-refrigerant solution.

It is yet another object of this invention to provide an absorption air conditioner and process for creating a refrigerant effect which utilizes a pump employing percolation and/or pulsation as a means for pumping.

These, together with the various ancillary objects and features which will become apparent to those skilled in the art as the following description proceeds, are attained by this novel absorption air conditioner and process, a preferred embodiment being shown with reference to the accompanying drawings, by way of example only, wherein:

BRIEF DESCRIPTION OF THE DRAWINGS

FIG. 4 is a vertical sectional view of one embodiment of the pump of the invention;

FIG. 5 is a vertical sectional view of the pump of this invention operating by percolation without pulsation;

FIG. 6 is a vertical sectional view of the pump of this invention operating the first and the second chambers by pulsation and without percolation; and FIG. 7 is a vertical sectional view of the pump of this invention operating with a single chamber through pulsation and with no percolation.

DETAILED DESCRIPTION OF A PREFERRED EMBODIMENT OF THE INVENTION

Figure 1:
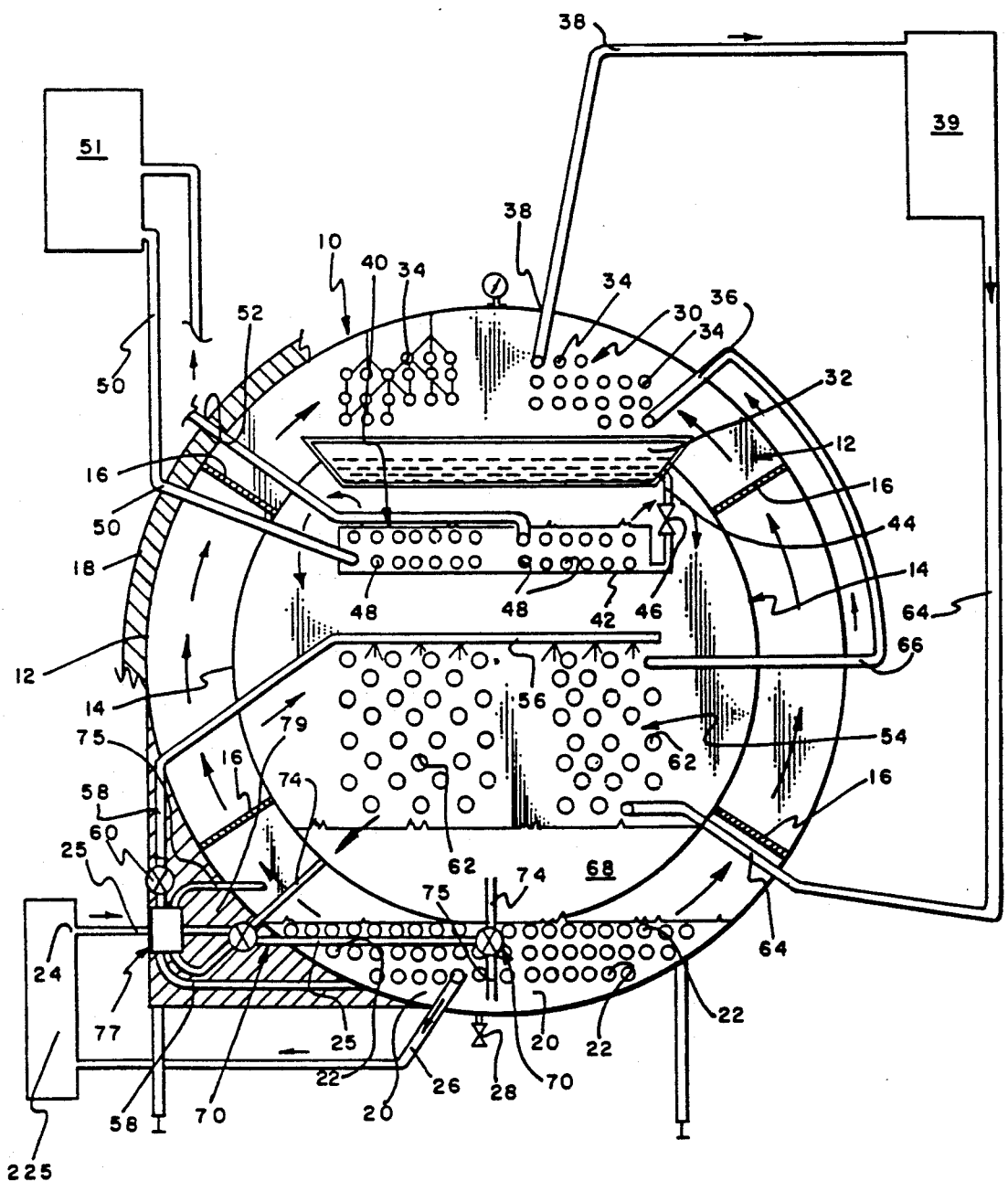
FIG. 1 is a schematic view of the absorption apparatus of this invention.

Referring in detail now to the drawings, wherein similar parts of the invention are identified by like reference numerals, there is seen the absorption air conditioner and/or refrigerator of this invention, generally illustrated as 10, having an outer or outside house 12 and an inner or inside house 14 disposed within the outer spherical house 12 by supports 16. House 12 and house 14 are preferably spherical in design and shape as illustrated in the drawings and will be referred to hereafter as "inner spherical house 14" and "outer spherical house 12". An insulator 18 surrounds the outer spherical house 12.

The inner spherical house 14 and the outer spherical house 12 are preferably disposed essentially concentrically with respect to each other. The inner spherical house 14 has an inner housing spherical wall and the outer spherical house 12 has an outer housing spherical wall. The supports 16 serve as a means for interconnecting the inner spherical house 14 including the inner housing spherical wall to the outer spherical house 12 including the outer housing spherical wall for supporting and maintaining the inner spherical house 14 and the outer spherical house 12 in a spaced relationship with respect to each other. The inner spherical house 14 is generally totally enclosed and hermetically sealed to the ambient environment of the inner spherical house 14. The ambient environment is the environment within the outer spherical house 12. Stated alternatively, the ambient environment is the environment between the inner spherical house 14 and the outer spherical house 12. The outer spherical house 12 generally totally encloses the inner spherical house 14 and is sealed to the ambient atmosphere of the outer spherical house 12. The ambient atmosphere is the outside atmosphere surrounding the outer spherical house 12. The outer spherical house 12 also hermetically seals the inner spherical house 14 (including the inside of inner spherical house 14) to or from the ambient atmosphere of the outer spherical house 12. Stated alternatively, the outer spherical house 12 including the outer housing wall totally surrounds and encloses the inner spherical house 14 including the inner housing wall and contains no open apertures wherethrough the inside of the outer spherical house 12 communicates with the atmosphere outside of the outer spherical house 12. It should be understood that hermetically sealing the inner spherical house 14 and the outer spherical house 12 does not exclude the passage of conduits, pipes, or the like, through the respective wall of the inner spherical house 14 and the outer spherical house 12 provided however that a hermetic seal is formed around any conduit, pipe, or the like, passing through a respective wall and the wall itself. Thus, "hermetically sealed" as used in the specification and the claims with respect to the inner spherical house 14 and the outer spherical house 12 does not exclude conduits, pipes, or the like, passing through the respective housing walls.

The outer spherical house 12 has a generator reservoir 20 disposed in the bottom thereof and underneath the inside spherical house 14. A generator coil 22 serving as a heat exchanger is placed within the generator reservoir 20 and in communication with an entrance conduit 24 through pump coil conduits 25—25 which interconnect to a pair of pumps generally illustrated as 70. A generator coil fluid of predetermined temperature passes through the pump coil conduits 25—25, the pumps 70—70 and into the generator coil 22. The generator coil fluid leaves the generator coil 22 through an exit conduit 26. Entrance conduit 24 and exit conduit 26 both extend outside of the outer spherical house 12 to a heat source 225 (e.g. solar collectors, gas boiler, any recoverable waste heat source, etc.) wherein the generator coil fluid is heated to a predetermined temperature. A drain 28, with a valve to close off and seal hermetically the inside of the outer spherical house 12 to the ambient atmosphere, is in the bottom of the outer spherical house 12 for draining the generator reservoir 20 from the outer spherical house 12.

A condensor, generally illustrated as 30, is disposed in the top of the outer spherical house 12. The condensor 30 includes a condensor pan or trough 32 with a convex bottom that also defines the top or roof of the inner spherical house 14. Condensor 30 also includes a condensor coil 34 having an entrance 36 and exit 38 wherethrough a condensor fluid enters and leaves the condensor coil 34, respectively. Exit 38 extends to an evaporative cooling tower means 39 or other heat removal means to cool the condensor fluid after it has left the condensor coil 34.

At the top of the inner spherical house 14 and underneath the condensor pan 32 is an evaporator, generally illustrated as 40, having an evaporator pan 42 interconnected to the condensor pan 32 by a conduit 44 with a flow control/expansion valve 46, and an evaporator coil 48 extended within the evaporator pan 42. An entrance evaporator conduit 50 extends from a cooling coil means 51, outside of the outer spherical house 12, to the evaporator coil 48, and supplies the matter (e.g. liquid, vapor, etc.) to be cooled to the evaporator coil 48. An exit evaporator conduit 52 extends from the evaporator coil 48 to the cooling coil means 51 outside of the outer spherical house 12, and provides a means for the matter that has been cooled to leave the evaporator coil 48.

An absorber, generally illustrated as 54, is situated in the inner spherical house 14 underneath the evaporator 40 and has spray heads 56 connected to a conduit 58 that leads from the generator reservoir 20. Conduit 58 includes flow control valve 60 for controlling the flow of fluid therethrough. The absorber 54 also has an absorber coil 62 that receives condensor fluid that has been cooled by the cooling tower means 39 through an absorber entrance conduit 64. Condensor fluid leaves the absorber coil 62 through an absorber exit conduit 66 which communicates with and connects to the entrance 36 of the condensor coil 34 in order to transmit the condensor fluid to the condensor coil 34. An absorber reservoir 68 is formed at the bottom of the inner spherical house 14 underneath the absorber coil 62. The solution that collects in the bottom of the absorber 54, collects as an absorber reservoir 68. Pumps 70—70 pump the solution of the absorber reservoir 68 from the absorber reservoir 68 through inlet conduits 74—74 and through outlet conduits 75—75 to the generator reservoir 20. One pump 70 serves as a means for flowing fluid from the absorber reservoir 68 at the bottom of the inner spherical house 14 to the generator reservoir 20 at the bottom of the outer spherical house 12. Another pump 70 serves as a means for flowing fluid from the generator reservoir 20 to the absorber spray heads of the absorber 54 disposed in the inner spherical house 14. A heat exchanger means, generally illustrated as, is placed between conduits 58 and 75 for cooling the solution means as it is being transferred from the generator reservoir 20 to the absorber spray head 56 and for heating the solution means as it is being pumped from the absorber reservoir 68 to the generator reservoir 20. Insulation 79 encases a pump 70, conduits 58 and 75, and pump coil conduits 25—25 as illustrated in FIG. 1.

All of the internals of the absorption apparatus 10 of this invention are preferably manufactured of stainless steel. More specifically, the outer spherical house 12, the inner spherical house 14, and the supports 16 that keep the two spherical houses 12 and 14 in a spaced relationship with respect to each other are made from stainless steel. The evaporator 40 and absorber 54 in the inner spherical house 14, and all of the individual components including conduits and coils that make-up the evaporator 40 and absorber 54, are made or manufactured from stainless steel. Similarly, the pumps 70—70 and generator coil 22 and associated conduits and the condensor 30 along with its associated coils and conduits, are all also made or manufactured from stainless steel. The evaporator 40 and absorber 54 are initially disposed in the inner spherical house 14 as desired when the inner spherical house 14 is open, preferably in a pair of hemispheres. The opened inner spherical house 14 is subsequently assembled or connected into a hermetically sealed integral spherical unit, preferably by t.i.g.- (tungsten inert gas) welding or by m.i.g.(metallic inert gas) welding in order to preserve the stainless steel integrity of the hermetically sealed integral inner unit. Any conduits piercing the inner spherical housing wall of the inner spherical housing 14 are accordingly sealed hermetically at the point of passage. Stainless steel belly bands and neoprene synthetic rubber seals may be employed to assist in forming the hermetically sealed integral inner spherical house 14. Subsequently, the pump 70 and the generator coil 22 and the condensor 30, along with the appropriate associated conduits and valves, are disposed in the outer spherical house 12 when the outer spherical house 12 is in an open posture, preferably in a pair of hemispheres. The inner spherical house 14 is thereafter disposed within the open spherical house 12 and secured to the spherical housing wall of the open spherical house 12 by at least one support 16 such that the inner spherical house 14 and the outer spherical house 12 occupy a spaced relationship with respect to each other. Appropriate conduits should be extending through the walls of the open outer spherical house 12 at the appropriate places (and sealed hermetically) such as to register with corresponding appropriate conduits of the inner spherical house 14 for connection therewith.

The opened or internally exposed outer spherical house 12 is assembled or connected into a hermetically sealed integral spherical unit, simular to the inner spherical house 14. Assembly may be accomplished by t.i.g. welding or m.i.g. welding in order to preserve the stainless steel integrity of the hermetically sealed integral outer unit. The outer spherical house 12 is hermetically sealed such that the inner spherical house 14 (as well as the outer spherical house 12) is hermetically sealed from the ambient atmosphere of the outer spherical house 12. Stainless steel belly bands and rubber seals may again be used as needed. The additional external components (e.g. insulation 18, pump 70, heat source 225, heat exchanger 77, cooling coil means 51, evaporative cooling tower means 39, and the associated valves and conduits, etc.) may be connected as desired to form the complete absorption apparatus 10. The stainless steel for which the appropriate parts are manufactured from is preferably from the 200 series (i.e. 201, 202, 204, and 204L) AISI type or from the 300 series (i.e. 301, 302, 302B, 303, 303 Se, 304, 304L, 305, 308, 309, 309 CT, 309S, 310, 314, 316, 316L, 317, 318, 321, 347, 347SE, and 348) AISI type. These AISI type series are listed in "Stainless Steel Fabrication" by Allegheny Ludlum Steel Corporation ®1959. Typically the 200 AISI type series and 300 AISI type series have a chromium content of at least 18% by weight, and are low in carbon content. More preferably, the appropriate parts are manufactured of stainless steel comprising an AISI type selected from the group consisting of 304, 304L, 316, 316L, 321 and 347.

The pumps 70—70 of this invention have an inlet, generally illustrated as 72, which includes the inlet conduit 74. Absorber reservoir 68 contains a chemical solution which is fed (e.g. by gravity) into the inlet conduit 74.

The pump 70 also includes a first chamber 78 and a second chamber 80 which is capable of being in communication with the first chamber 78. First chamber 78 has an inlet 82 communicating with the inlet conduit 74, and an outlet 84. In a preferred embodiment of the invention, first chamber 78 includes a conduit 86 which connects to the bottom of a diaphragm housing 88 of a pulsator, generally illustrated as 90, located away from the absorption air conditioner and/or refrigerator 10 of this invention. A back pressure valve 92 is positioned at the inlet 82 in order to allow the unidirectional passage of fluid from the inlet conduit 74 into the first chamber 78, but not from the first chamber 78 back into the inlet conduit 74.

The second chamber 80 has an inlet 94 and an outlet 96 which directly communicates with and ties into an inlet 98 of a conduit outlet 75 that leads to the generator reservoir 20 which receives the fluid that is being pumped by the pump 70. Inlet 94 of the second chamber 80 has a back pressure valve 102, and inlet 98 of the conduit outlet 75 has a back pressure valve 104. Back pressure valves 102 and 104 operate similarly to back pressure valve 92; that is, back pressure valve 102 and 104 respectively allow the unidirectional passage of fluid from the first chamber 78 into the second chamber 80, and from the second chamber 80 into the conduit 75 (for transportion to the generator reservoir 20), respectively, but not from the second chamber 80 back into the first chamber 78, and not from the conduit 75 back into the second chamber 80, respectively.

A heating coil 106, with a coil inlet 108 and a coil outlet 110, circumscribes helically both the first chamber 78 and the second chamber 80 (as illustrated in FIG. 4) such that when the generator fluid of predetermined temperature enters the coil inlet 108 from pump coil conduit 25 to commence a circuitous flow around th first and second chambers 78 and 80, the generator fluid of predetermined temperature flows circuitously around the second chamber 80 prior to flowing circuitously around the first chamber 78. The heating coil 106 is encased by an insulator 112 as illustrated in FIG. 4.

Figure 3:
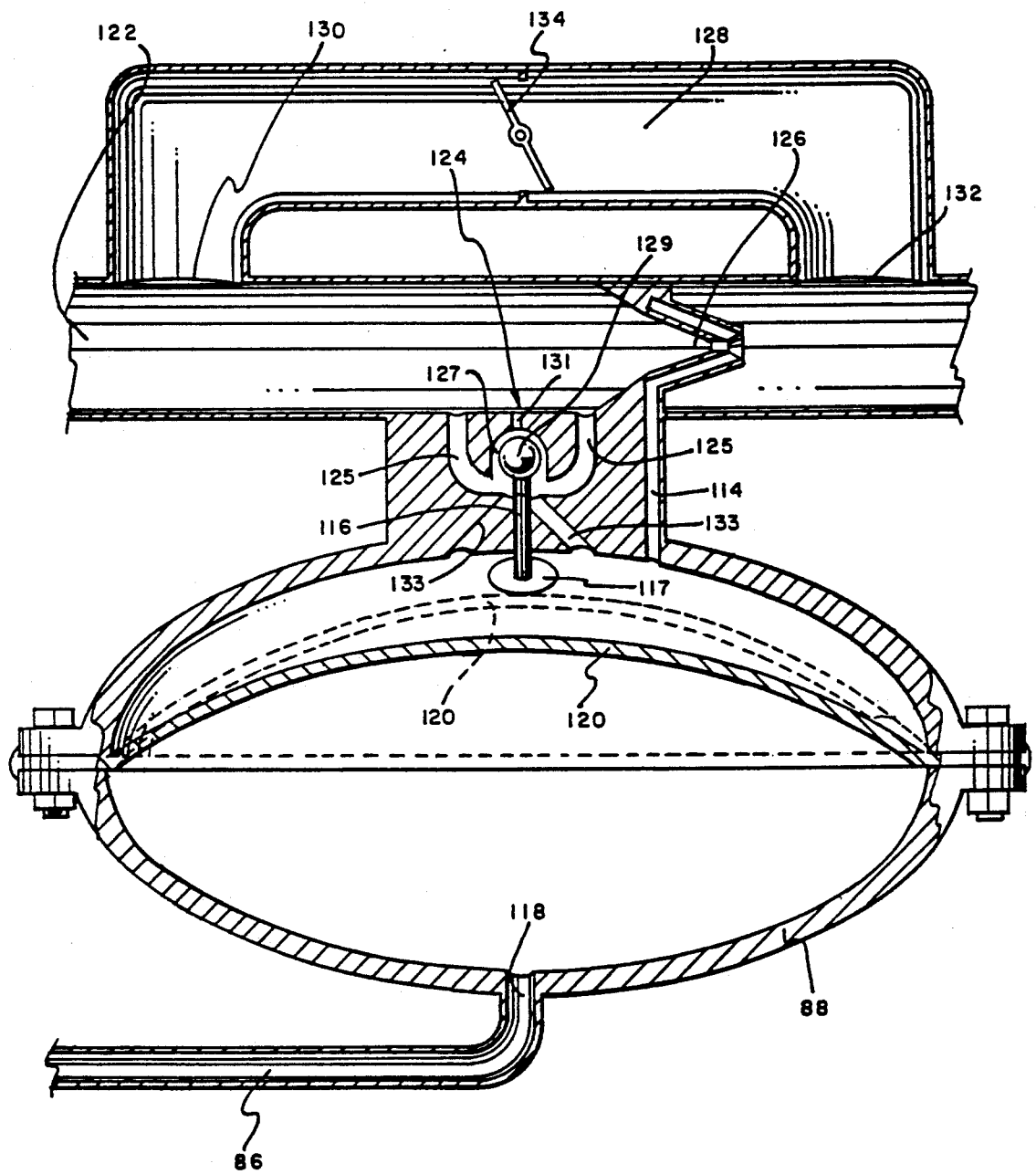
FIG. 3 is a partial vertical sectional view of the pulsator in communication with the diaphragm conduit having the diaphragm valve in an open position.

The diaphragm housing 78 of the pulsator 90 has a port 114, a rod 116 (having a plate 117) slidably secured therein, an inlet 118 in direct communication with the conduit 86, and a diaphragm 120 disposed within the diaphragm housing 88 such as to totally separate and secure communication of the inlet 118 from the port 114 and the rod 116, and to be in a posture to contact the rod 116 including its plate 117 upon expansion of the diaphragm 120, to the position indicated by the dotted lines in FIG. 3.

A diaphragm conduit 122 is secured to or in communication with the diaphragm housing 88 and has a diaphragm valve generally illustrated as 124, positioned in and contained therein. Diaphragm valve 124 includes a generally U-shaped passageway 125, a recess 127 residing at the base of the U-shaped passageway 125 to house a valve ball 129 slidably disposed therein, a vent hole 131 communicating the diaphragm conduit 122 with the recess 127, and a pair of diverging openings 133—133 extending from the base of the U-shaped passageway 125 into the diaphragm housing 88. Diaphragm valve 124 may be opened (see FIG. 3) when the rod 116 is slid upwardly against the valve ball 129 from the expansion of the diaphragm 120. Continual upward displacement of the rod 116 from expansion of the diaphragm 120 causes the valve ball 129 to seat in the recess 127.

The diaphragm conduit 122 also includes a venturi nozzle 126 that is disposed within the conduit 122 after the diaphragm valve 124. The end of the venturi nozzle 126 communicates with the port 114 such that the higher velocity, higher pressure fluid exiting through the venturi nozzle 126 creates a suction within the diaphragm housing 88 through the port 114, causing the diaphragm 120 to be drawn towards the rod 116 for eventual contact with the same, as evidenced by the dotted lines in FIG. 3. When the diaphragm 120 is drawn towards the rod 116, more fluid is drawn into the diaphragm housing 88 through the conduit 86 from the first chamber 78 and through the back pressure valve 92 from the inlet conduit 74. As previously mentioned, the contact of the diaphragm 120 with the rod 116, slides the rod 116 upwardly against the valve ball 129 to open the valve 124, as illustrated in FIG. 3.

With the valve 124 in an open position, any fluid flowing through the conduit 122 will be channeled through the U-shaped passageway 125, the pair of diverging openings 133—133 and into the diaphragm housing 88. This generally ceases the expansion of the diaphragm 120 from the suction through the port 114. With the ingress of fluid through the valve 124, the fluid entering the diaphragm housing 88 pressurizes the diaphragm 120 to commence expansion of the diaphragm 120 towards the inlet 118.

Figure 2:
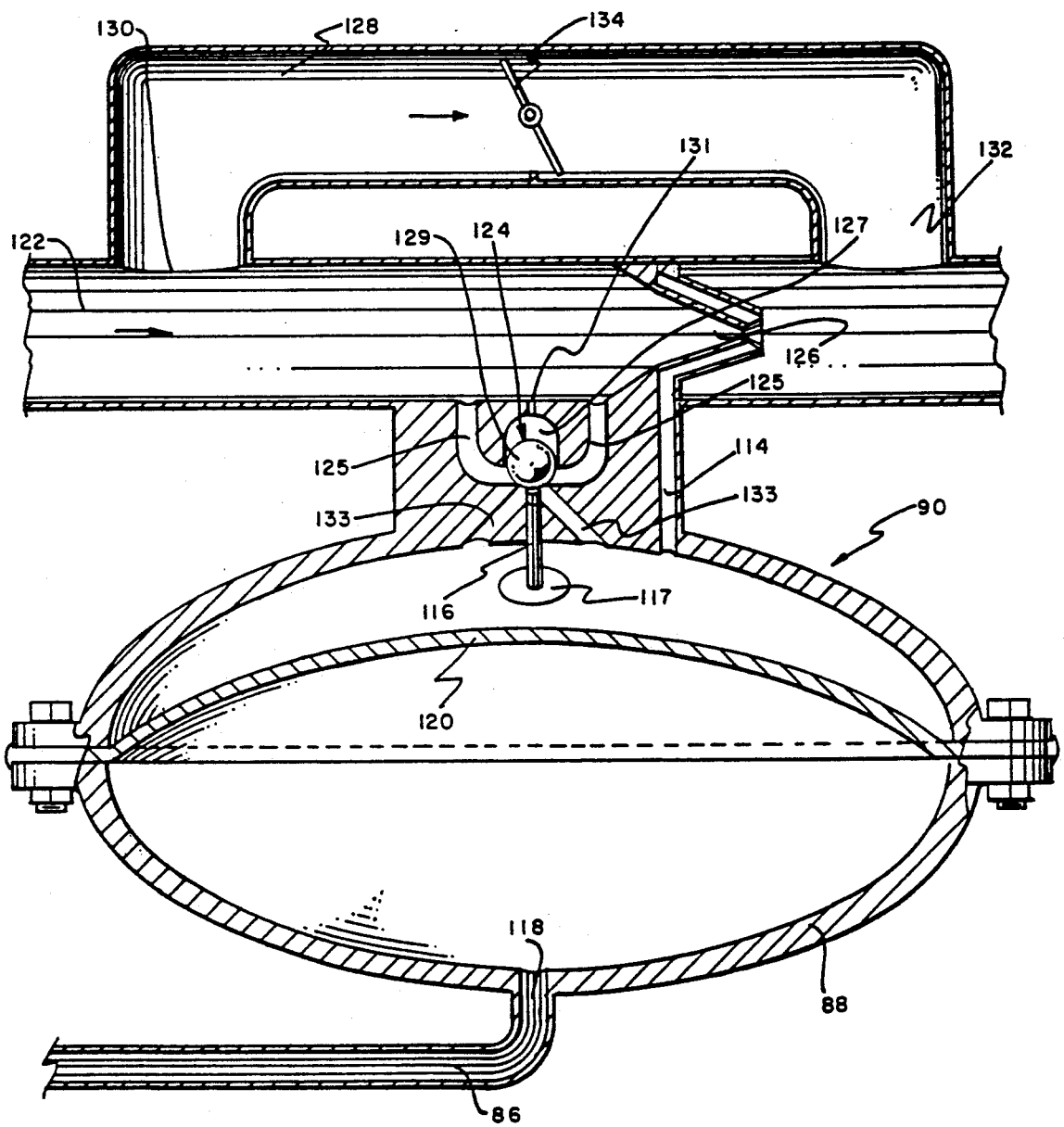
FIG. 2 is a partial vertical sectional view of the pulsator in communication with a diaphragm conduit having a by-pass conduit, a venturi nozzle, and a diaphragm valve in a closed position.

Simultaneous with the expansion of the diaphragm 120 towards the inlet 118, expulsion of the fluid from behind the inlet 118 side of the diaphragm 120 is conducted from within the diaphragm housing 88, the conduit 86, and the first chamber 78 through the back pressure valve 102 and into the second chamber 80. As the diaphragm 120 expands towards the inlet 118, it ceases to be in contact with the rod 116, and the rod 116 slides downwardly. The valve ball 129 will generally remain in the recess 127 from the fluid flowing through the base of the U-shaped passageway 125, comparable to a ping-pong ball being kept aloft pneumatically. The vent hole 131 allows the bleeding off of any fluid between the ball valve 129 and the top of the recess 127, to prevent any resistance to the ball valve 129 travelling upward, from compression of fluid within the recess 127. When the inflowing fluid through diaphragm valve 124 has expanded the diaphragm 120 to its limit towards inlet 118 and the diaphragm 120 can expand no more, the diaphragm valve 124 slide of the diaphragm 120, including the diaphragm valve 124 itself, is essentially completely full of fluid and reduces fluid flow through the U-shaped passageway 125. This causes the valve ball 129 to settle downward and seat, closing off the pair of diverging openings 133—133, as illustrated in FIG. 2. With the valve ball 129 seated over openings 133—133 no fluid can flow through the diaphragm valve 124, but is therefore conducted towards and through the venturi nozzle 126, creating again a suction with the diaphragm housing 88 through the port 114, and causing any fluid entrapped between the diaphragm valve 124 and the diaphragm 120 to be sucked through the port 114 into the diaphragm conduit 122 and drawing again the diaphragm 120 towards the rod 116. As previously stated, as the diaphragm 120 is drawn towards the rod 116, fluid is drawn into the diaphragm housing 88 through the back pressure valve 92 from the inlet conduit 74. Thus, the entire process is being repeated, creating a pulsation effect.

In a preferred embodiment of the invention, diaphragm conduit 122 includes connected thereto a by-pass conduit 128 having an inlet 130 and an outlet 132. The inlet 130 of the by-pass conduit 128 is in communication with the diaphragm conduit 122 prior to the venturi nozzle 126. The outlet 132 of the by-pass conduit 128 is positioned such as to be in communication with the diaphragm conduit 122 after the venturi nozzle 126. With the inlet 130 and the outlet 132 of the by-pass conduit 128 positioned as such, the by-pass conduit 128 straddles the venturi nozzle 126. Preferably, a flow-control valve 134 is positioned in the by-pass conduit 128 in order to control the flow of by-pass fluid therethrough.

The absorbent-refrigerant solution of this invention comprises a promoter that enchances the vapor-absorbent properties of the absorbent-refrigerant solution. The promoter of this invention is preferably a transition metal halide. The transition metal is selected from Group IB, Group IIB, Group IIIA, Group IVA, Group VA, Group VIA, Group VIIA and Group VII of the long form of the Periodic Table (Mendeleef's original Periodic Table as modified to the "long-form", originally proposed by Julius Thomsen) as illustrated in Chapter 12 of "Chemistry" Third Edition by Quagliano and Vallarino ⓡ1958, 1963, 1969 by Prentice-Hall Inc. (Library of Congress Catalog No. 69-10012). The halogens from which the halides are are formed are the elements of Group VIIB of the Periodic Table, more specifically, fluorine, chlorine, bromine, iodine and astatine. Preferably the transition metal halide is at least one compound from Group IVa halides and/or Group IVa fluoride and/or titanium halide. More preferably, the promoter is a compound selected from the group consisting of titanium trifluoride, titanium tetrafluoride, and mixtures thereof; and comprises from about 10% by weight to about 90% by weight of titanium trifluoride and, correspondingly, from about 90% by weight to about 10% by weight of titanium tetrafluoride. Stated alternatively, the transition metal halide comprises titanium trifluoride and titanium tetrafluoride in a ratio of from about 1:9 to about 9:1 by weight. Most preferably, the promoter comprises about 40% by weight titanium tetrafluoride and about 60% by weight titanium trifluoride, or 2 parts by weight of titanium tetrafluoride to 3 parts by weight of titanium trifluoride.

The absorbent-refrigerant solution preferably additionally comprises water (preferably distilled) and a refrigerant compound with absorbent properties, such as by way of illustration only alkali metal halides, ammonia, methylamines, alcohols, sulfur dioxide, and halogenated hydrocarbons. Preferably, the refrigerant compound is an alkali metal halide. More preferably, the alkali metal halide is lithium bromide. In a preferred embodiment for the present invention, the absorbent-refrigerant solution comprises from about 5% by weight to about 60% by weight of the alkali metal halide, from about 40% by weight to about 95% by weight of water, and from about $10^{-8}$% by weight to about 0.10% by weight of the transition metal halide.

A surface tension reducer agent is preferably added to the absorbent-refrigerant solution in order to improve the evaporative properties of the absorbent-refrigerant solution. The surfactant may be any agent that is capable of performing this function, but is preferably a surfactant. More preferably, the surfactant is an alcohol, such as octyl alcohol. When the absorbent-refrigerant solution includes a surfactant, the solution contains from about 1% by weight to about 40% by weight of the alkali metal halide; from about 55% by weight to about 94% by weight of water; from about $10^{-8}$% by weight to about 0.10% by weight of the transition metal halide; and from about 0.1% by weight to about 5% by weight of the surfactant.

When the absorbent-refrigerant solution of this invention is employed in an absorption apparatus 10 producing freezing or below freezing temperatures, the absorbent-refrigerant solution should contain an antifreezing agent, preferably an alcohol, such as ethyl alcohol, in order to lower the freezing temperature of the absorbent-refrigerant solution. In a preferred embodiment of the invention, the absorbent-refrigerant solution that is capable of assisting the production of freezing or below freezing temperature comprises from about 0.5% by weight to about 70% by weight of the alkali metal halide; from about 20% by weight to about 95% by weight of the water; from about $10^{-8}$% by weight to about 0.10% by weight of the transition metal halide; from about 0.1% by weight to about 5% by weight of the surfactant; and from about 0.1% by weight to about 5% by weight of the antifreezing agent. The absorbent-refrigerant solution of this invention may additionally comprise from about 0.1% by weight of about 1% by weight of a corrosion inhibitor, such as lithium nitrate, to act as an inhibitor to reduce corrosion, extend apparatus life, and stabilize solution characteristics.

It should be understood that it is believed that when the transition metal halide promoter of this invention is added to water and/or the refrigerant compound, the transition metal halide may break down, metabolize, metamorphoses, or the like, into other compounds in the water and/or refrigerant compound solution, especially under the process conditions of this invention. This would be especially true when the transition metal halide is titanium trifluoride, or titanium tetrafluoride and/or titanium trifluoride. Thus, when the specification and claims refer to a transition metal halide promoter, it is intended herein that such reference includes not only the original transition metal halide promoter alone but also all resultant compounds, metabolites, or the like, resulting from any break down, metamorphoses, or the like, of the original transition metal halide promoter alone. Thus, it is intended that the present invention is to cover not only the promoter (i.e. a transition metal halide) in an initial state before any breakdown and the absorbent-refrigerant solution containing the promoter, water and refrigerant compound (as well as any other agents) in an initial state also before any breakdown; but also any and all by-compounds, or the like, resulting or emanating from the initial promoter or the initial absorbent-refrigerant solution even if the initial compound(s) in the initial promoter or in the initial absorbent-refrigerant solution no longer exist or can not all be identified with specificity. Therefore, the invention is to include mixing an absorbent-refrigerant solution with a promoter that enhances the vapor absorbent properties of the absorbent-refrigerant mixture whose specific constituents or components may not be known or can not all be identified with specificity; and disposing the absorbent-refrigerant mixture into the absorption apparatus 10. This invention is to further include evaporating at least a portion of the absorbent-refrigerant mixture into a refrigerant vapor whose specific constituents or components may not be known or can not all be identified with specificity, leaving a residual absorbent-refrigerant mixture whose specific constituents or components may not be known or can not all be identified with specificity. This invention is to yet further include condensing the refrigerant vapor into a refrigerant liquid whose specific constituents or components may not be known or can not all be identified with specificity; and flowing the refrigerant liquid into an evaporative zone wherein the refrigerant liquid evaporates into a refrigerant liquid evaporate whose specific constituents or components may not be known or can not all be identified with specificity. The evaporation of the refrigerant liquid produces a refrigerant effect. Finally, the step of absorbing (e.g. by spraying) the refrigerant liquid evaporate with the residual absorbent-refrigerant mixture into a condensed absorbent-refrigerant solution whose specific constituents or components may not be known or can not all be identified with specificity is included within the spirit and scope of this invention as well as flowing the condensed absorbent-refrigerant solution to be admixed with the residual absorbent-refrigerant mixture to produce an absorbent-refrigerant solution, that may be different in total chemical composition than the original absorbent-refrigerant solution that was initially charged to the absorption apparatus 10, and whose specific constituents or components may not be known or can not all be identified with specificity. The cycle may subsequently be repeated to produce yet another refrigerant vapor, another residual absorbent-refrigerant mixture, another refrigerant liquid, another refrigerant liquid evaporate, and yet another condensed absorbent-refrigerant solution, all of whose specific constituents or components may not be known or can not all be identified with specificity, and whose respective total chemical composition is respectively different than the initially produced refrigerant vapor, residual absorbent-refrigerant mixture, refrigerant liquid, refrigerant liquid evaporate, and condensed absorbent-refrigerant solution. The present invention is to cover all of the foregoing.

The generator reservoir 20 produces not only a refrigerant vapor that is delivered to the condensor 30 by convection, but also a concentrated solution which is supplied to the absorber spray head 56 via conduit 58 and flow control valve 60.

As the refrigerant vapor enters into contact with the coil 34 of the condensor 30, it is condensed at a predetermined temperature (e.g. 80° F. to 111° F.) into a liquid, giving up its heat to the condensor coil 34 and dropping into the liquid refrigerant pan 32. The condensation process is started due to the temperature of the condensor fluid (preferably water) that enters conduit 36 from the conduit 66 of the absorber 54 which should be cooler than the boil off temperature the refrigerant solution used. As the refrigerant vapor is condensed into a liquid and cooled, it subsequently flows down through the conduit 44 and valve 46 and into the evaporator pan 42 of the evaporator 40.

In a preferred embodiment of the invention, the pressure in the evaporator 40 (e.g. 0.05 mm Hg to 13 mm Hg at 40° F.) is lower than the pressure in the condensor 30 (e.g. 50 mm Hg to 55 mm Hg at 104° F.), enabling some of the refrigerant liquid to vaporize at a predetermined temperature (e.g. −60° F. to +60° F.) from the evaporator pan 42, creating the refrigerant effect on any matter in the evaporator coils 48 that has flowed from cooling coil means 51, through conduit 50 and into the evaporator coil 48. The pressure in the evaporator 40 is preferably a vacuum which would be created by hydroscopic action in the absorber 54 directly below. The temperature within the immediate atmosphere of the absorber 54 is typically from 70° F. to 95° F. The refrigeration effect cools the matter returning to the cooling coil means 51 from the evaporator coil 48 through conduit 52. The user of the cooling coil means 51 would use the same for cooling/freezing. The operating temperatures of the absorption apparatus 10 depends on operating pressures and vice versa, as well as whether the cooling coil means 51 is being used for cooling (above 32° F.) or freezing (below 32° F.).

As the refrigerant liquid and vapor pass down into the absorber 54 from the evaporator pan 42, a concentrated solution of the refrigerant liquid originating from the generator reservoir 20 is sprayed out through the absorber spray head 56 into the flow of descending refrigerant liquid vapor. The hygroscopic action between the solutions should preferably create an extreme vacuum in the evaporator 40, which would help the evaporation process and increases the refrigeration effect. As the related concentration of refrigerant liquid from the absorber spray heads 56 and the evaporator 40 combine, heat is given off, which will be removed by the absorber coils 62. In the absorber coils 62, condensor water, from the evaporative cooling tower means 39, or from any other cool sources such as a well or any other large water supply, enters the absorber coil 62 through conduit 64 and gains heat from the combining action of the fluids within the absorber 54, and exits through conduit 66 for travelling to the condensor coil 34. A dilute solution 68 of the refrigerant liquid collects as absorber reservoir 68 in the bottom of the absorber 54 in the inner spherical house 14, from where it is pumped by pump 70 into the bottom of the outer spherical house 12 to form the refrigerant solution making up the generator reservoir 20. In a preferred embodiment of the invention, there are two pumps 70—70. One of the pumps 70 is positioned in the generator reservoir 20 between the inner spherical house 14 and the outer spherical house 12 and the other pump 70 is encased in insulation 79 outside of the outer spherical house 12. As was previously mentioned, the pulsator 90 and diaphragm conduit 122 for any particular pump 70 is situated outside of and away from the absorption air conditioner and/or refrigerator 10 of this invention. The cycle is now complete and the process becomes continuous.

With continuing reference to the drawings for operation of the invention and the percolation process for pumping the refrigerant solution from the absorber reservoir 68, the refrigerant solution to be pumped is filled through conduit 74 at a predetermined pressure against the back pressure valve 92 until the same is opened, fills the first chamber 78, pressurizes the back pressure valve 102 until the same is opened, depending on pressure and temperature and enters the second chamber 80. Before the second chamber 80 is filled completely, the predetermined pressure including the refrigerant solution head in the first and the second chambers 78 and 80, respectively, is generally equalized or less than the pressure in the reservoir conduit 75, causing back pressure valves 92 and 102 to close as the fluid starts to heat and expand.

A generator fluid of predetermined temperature is introduced from the pump coil conduit 25 through the coil inlet 108 to commence a circuitous course within the heating coil 106 initially around the second chamber 80 and subsequently around the first chamber 78. The boiling temperature of the refrigerant solution being pumped should be such that the heat from the heating coil 106 (being approximately at the predetermined temperature of the generator flud) causes the refrigerant solution being pumped to initially percolate or boil at least once in the second chamber 80. As the refrigerant solution being pumped percolates in the second chamber 80, the vapor pressure in the second chamber 80 from this percolating refrigerant solution causes the back pressure valve 104 to open at least once from the increase of pressure within the second chamber 80. With the back pressure valve 104 open, expulsion of, from percolation of the refrigerant solution being pumped commences from within the second chamber 80, through the back pressure valve 104 and into the conduit 75 for eventual residence in the generator reservoir 20. After all or a majority of the refrigerant solution being pumped in the second chamber 80 has been percolated out, the back pressure valve 104 automatically closes, when the pressure in the second chamber 80 is generally equalized with the pressure in the reservoir conduit 75. It should be understood that percolation within the second chamber 80 in conjunction with the opening of the back pressure valve 104 usually occurs more than once before all or a majority of the refrigerant solution being pumped has percolated out of the second chamber 80.

After the refrigerant solution being pumped initially percolates in the second chamber 80 from the generator fluid initially circuitously flowing around the second chamber 80, the generator fluid in the first chamber 78 being pumped subsequently percolates at least once from the heat of the heating coil 106 around the first chamber 78 being at the predetermined temperature. As the generator fluid in the first chamber 78 percolates, the vapor pressure within the first chamber 78 increases and opens the back pressure valve 102 at least once. With back pressure valve 102 open, expulsion of the refrigerant solution being pumped commences from within the first chamber 78, through the back pressure valve 102 and into the second chamber 80. As was the case for the percolation within the second chamber 80, after all or a majority of the refrigerant solution being pumped in the first chamber 78 has been percolated out, the back pressure valve 102 closes automatically when the pressure in the first chamber 78 is generally equalized with the pressure in the second chamber 80. As was also the case for the percolation within the second chamber 80, it should be understood that percolation within the first chamber 78, in conjunction with the opening of the back pressure valve 102, usually occurs more than once before all or a majority of the refrigerant solution being pumped has percolated out of the first chamber 78. With the loss of a refrigerant fluid head from the essentially fluidless first chamber 78, the predetermined pressure against the back pressure valve 92 automatically opens the back pressure valve 92 to fill the first chamber 78. The entire process is now in a posture for being repeated, creating thus the percolation effect.

With further continuing reference to the drawings for further operation of the invention and the pulsating process for pumping the refrigerant solution, as fluid is initially flowed through the diaphragm conduit 122, diaphragm valve 124 is closed from the valve ball 129 being seated as illustrated in FIG. 2, and the flow-control valve 134 is opened to a predetermined position in order to adjust the rate of the fluid flowing through the diaphragm conduit 122 and the venturi nozzle 126. As the flowing fluid enters the venturi nozzle 126, the velocity of the flowing fluid increases from the gradual decrease in diameter of the venturi nozzle 126. When higher velocity and pressure fluid egresses through the venturi nozzle 126, a suction or vacuum is created within the diaphragm housing 88 through the port 114. This reduction in pressure causes the diaphragm 120 to be drawn towards rod 116 which simultaneously causes a suction behind the diaphragm 120, in the conduit 86 and in the first chamber 78. A suction in the first chamber 78 causes the predetermined pressure on the back pressure valve 92 to open the same, sending the refrigerant solution through the back pressure valve 92, into the first chamber 78, and into the conduit 86. The diaphragm 120 is continually drawn towards the rod 116 until it contacts the same to slide the rod 116 upwardly to unseat the valve ball 129 and open the diaphragm valve 124 (as illustrated in FIG. 3). As the valve ball 129 is unseated and pushed upwardly into the recess 127 by the rod 116, any fluid sandwiched between the valve ball 129 and the top of the recess 127 is dispersed through vent hole 131 into the diaphragm conduit 122 to facilitate the upward movement of the valve ball 129. With the diaphragm valve 124 in an open position, part of the fluid flowing through the diaphragm conduit 122 exits from the same through the U-shaped passageway 125, through the pair of diverging openings 133—133, and into the diaphragm housing 88 between the diaphragm valve 124 and the diaphragm 120. This instantaneously starts the diaphragm 120 moving in the reverse direction (i.e. towards the inlet 118) from the inflow of fluid through the diaphragm valve 124 into the diaphragm housing 88, filling the space between the diaphragm valve 124 and the diaphragm 120 and pressurizing the latter, as a balloon being filled with air. Some of the fluid flowing through diaphragm conduit 122 will continue through the venturi nozzle 126, continuing a suction within the diaphragm housing 88 through the port 114. However, this residual suction is of little consequence due to volumetric differences so as to affect the inflow of fluid through the diaphragm valve 124 and the filling of the crevice between the diaphragm valve 124 and the diaphragm 120 with fluid.

This reverse direction expansion of the diaphragm 120 expells any indrawn fluid within the diaphragm housing 88 between the inlet 118 and the diaphragm 120, within the conduit 86 and the first chamber 78, through the back pressure valve 102 and into the second chamber 80. Back pressure valve 92 closes on the reverse direction expansion of the diaphragm 120. As the diaphragm 120 expands towards the inlet 118, rod 116 starts sliding downwardly to eventually cease contact with the valve ball 129. As previously mentioned, the valve ball 129 will generally remain in the recess 127 from the fluid flowing through the base of the U-shaped passageway 125 and diverging outwardly through the pair of openings 133—133. After the diaphragm 120 has expanded to its limit towards inlet 118 and the cavity between the diaphragm 120 and the diaphragm valve 124, including the valve 124 itself, is essentially full of the fluid, the ingress of fluid through the U-shaped passageway 125 is sufficiently reduced such that the valve ball 129 seats to close-off the openings 133—133. The fluid now flowing through diaphragm conduit 122 is now sent through the venturi nozzle 126 to again create the suction within the diaphragm housing 88 via port 114 which again causes the diaphragm 120 to be drawn towards the rod 116 to repeat the entire process. The entire process may be continuously repeated to give the pulsation effect on the first chamber 78. Any residual fluid between the diaphragm 120 and the closed diaphragm valve 124 may be withdrawn through the port 114 with the suction through the same.

In the event that there is not enough refrigerant solution indrawn through the back pressure valve 92 into the first chamber 78, and through the conduit 86 and into the diaphragm housing 88 (between the inlet 118 and the diaphragm 120) upon the initial expansion of the diaphragm 120 towards the rod 116, no refrigerant solution would be expelled on the reverse direction expansion of the diaphragm 120. But the expansion and reverse direction expansion of the diaphragm 120 would be continued until there would be sufficient indrawn refrigerant solution within the first chamber 78, the conduit 86 and the diaphragm housing 88 such that the reverse direction expansion of the diaphragm 120 would expel the indrawn refrigerant solution, or a portion thereof, out of the diaphragm housing 88, the conduit 86 and the first chamber 78, through the back pressure valve 102 and into the second chamber 80. The pulsation rate can be controlled by the flow rate of the fluid through the diaphragm conduit 122 and/or the setting of the flow-control valve 134 which would allow some of the fluid flowing through the diaphragm conduit 122 to by-pass the venturi nozzle 126.

The percolation process and the pulsation process in affecting the pumping operation of the pump 70 may be mutually exclusive as exhibited in FIGS. 5 and 6, or, preferably, in a preferred embodiment of the invention as exhibited in FIG. 4, the percolation and pulsation process operate simultaneously and mutually inclusively to operate the pump 70 of this invention. The percolation assists the pulsation, and the pulsation would assist the percolation, in order to more efficiently operate the pump 10 of this invention.

The pump 70 of this invention may only utilize a first chamber 78, omitting the second chamber 80, the inlet 94, and the back pressure valve 102, and still operate through pulsation to move refrigerant solution from the absorber reservoir 68 into the conduit 75 that leads to the generator reservoir 20. The effectiveness of this embodiment of the invention would depend on the pressure against back pressure valve 92, the sizing of the first chamber 78, the pressure in the conduit 75, and the pulsation rate and force of the pulsator 90.

The absorbent-refrigerant solution to be used in the absorption air conditioner 10 and to be pumped by the pump 70 through percolation may be any suitable absorbent-refrigerant solution as previously described which is capable of boiling at predetermined pressures in the generator reservoir 20, the evaporator 40 and in the first and second chambers 78 and 80, respectively, of the pump 70 at the predetermined temperature of the generator fluid making a circuitous path through the coil 106 of the pump 70, the generator coil 22, and the predetermined temperature of the evaporator fluid which enters the evaporator coil 48 and receives the refrigerant effect. The characteristics of the absorbent-refrigerant solution of this invention, which are desired in the absorption air conditioner 10 (and the process for producing a refrigerant effect) of this invention, are as follows:

(A) The ratio of the latent heat of vaporization of the refrigerant fluid (water) to the heat required to separate the refrigerant fluid (water) from the absorbent chemicals and produce refrigerant vapor should be as near as possible (i.e. typical ratios are between 0.7 and 0.9). (B) The solubility of the refrigerant fluid (water) in the absorbent chemicals should be extraordinarily high at the absorber temperature and at the pressure corresponding to the evaporator temperature. (C) The viscosity of the refrigerant solution should be low to facilitate rapid absorption in the absorber and to minimize pumping requirements. (D) The diffusion, mixing and heat transfer characteristics of the refrigerant solution should facilitate rapid absorption of refrigerant fluid (water) through the boundary layer of the refrigerant solution. (E) A high proportion of the refrigerant fluid (water) content of the refrigerant fluid (water) rich refrigerant solution should be recoverable upon distillation to minimize the amount of the refrigerant solution that must be circulated. (F) The absorbent chemicals should be nonvolatile, or at least much less volatile than the refrigerant fluid (water) to avoid or minimize carryover of the absorbent chemicals into the condensor 30. The presence of significant absorbent chemical carryover necessitates the installation of a rectification system between the generator reservoir 20 and condensor 30. (G) The solidification temperature of any liquid solutions which may exist in the system should be lower than any temperature which can be encountered during operation to avoid clogging of the system piping.

The generator fluid may be any fluid or vapor that is capable of being heated to a desired temperature (e.g. $-100°$ F. to $500°$ F.) by any heating source means 225 (e.g. solar collectors, gas boiler, or from any recoverable waste heat source). The fluid is preferably a fluid that may be readily flowed through the generator coil 22 and through the pump conduit coil 25 and the coil 106 of pump 70 to make the circuitous path to transfer heat to the generator reservoir 20 and the first and second chambers 78 and 80, respectively, to percolate the refrigerant solution being evaporated and pumped. Preferably, the generator fluid is water.

The fluid passing through condensor coil 34 and the absorber 62 from the cooling tower means 39 may be any fluid or vapor that is capable of being heated by the absorber coil 62 and the generator coil 34 and subsequently cooled by the cooling tower means 39. Preferably, the fluid is water.

The pressure in the condensor 30 area of the outer spherical housing 12 should be higher than the pressure in the evaporator 40 of the inner spherical housing 14. It is this reduction of pressure that allows condensate leaving the condenstate pan 42 to evaporate in the evaporator pan 42 while absorbing heat from the evaporator coil 48 and reducing the temperature of the evaporator fluid, which may be any fluid or vapor such as water, antifreeze, freon, etc. Preferably, the pressure in the outer spherical housing 12 (including the condensor 30 area) is between about 35 mm to about 65 mm Hg absolute pressure. The pressure in the inner spherical housing 14 (including the evaporator 40 area) is preferably between about 0.001 mm to about 12 mm Hg absolute pressure. The pressure differential between the inner spherical housing 14 and the outer spherical housing 12 depend on the constituency of the refrigerant solution and the temperatures of the evaporator fluid and the generator fluid.

The operating pressures of the refrigerant solution within the reservoir 68, the inlet 74, the first and second chambers 78 and 80, and within the conduit 75 (and generator reservoir 20) may be any suitable pressure (which would also include any fluid head) that is capable of urging a pressure against the back pressure valve 92, and flowing therethrough when the same is lifted by pulsator 90. In a preferred embodiment of the invention, the pressure in the reservoir 68 is lower than the pressure in the conduit 75; and for this preferred embodiment there is a pressure differential between the pressure on back pressure valve 92 and the pressure in the conduit 75, the operating pressures in the reservoir 68 and in the conduit 75 should be of such a caliber that, when the refrigerant solution being pumped flows (e.g. by gravity) from the reservior 68 down the inlet 74, the refrigerant solution opens the back pressure valve 92, fills the first chamber 78, opens the back pressure valve 102, and enters the second chamber 80 but doesn't completely fill the second chamber 80 because of the equalization of pressure between the pressure in the second chamber 80 and the pressure in the conduit 75. More preferably, operating pressures between the reservoir 68/inlet 74 and the conduit 75 are of such pressures that enable the refrigerant solution being pumped to boil or percolate under the temperatures that are being conducted to the inside of the first and second chambers 78 and 80, respectively, from the heat of the generator fluid flowing through the coil 106. Most preferably, the operating pressures are under vacuum conditions wherein the pressure existing in the atmosphere of the reservoir 68 is a vacuum of between about 0.001 mm to about 12 mm Hg (absolute) and the pressure existing in the conduit 75 (and the destination reservoir 20) is also a vacuum but having a higher pressure of between about 35 mm to about 65 mm Hg (absolute). Obviously, operating differential pressures for the pump 70 would depend on the type of refrigerant fluid being pumped and the temperature of the generator fluid.

The fluid flowing through the diaphragm conduit 122 may be any suitable fluid that is capable of performing the function of such fluid. Preferably, as a matter of economics, the fluid flowing through diaphragm conduit 122 is water. The flow rate of the fluid depends on the pressure differential driving the fluid, and the size of diaphragm conduit 122, readily discernible to those in the art. The flow rate, along with the size of the venturi nozzle 126, the size of the diaphragm valve 124 and its various passageways, the size of the by-pass conduit 128, and the setting of the flow ocntrol valve 134, all in combination would dictate the pulse rate of the pulsator 90, which in a preferred embodiment of the invention would be between 1 and 50 pulses/min. More preferably, the pulse rate is about 1 to 30 pulse/min.

As previously mentioned, the air conditioner 10 and/or refrigerator and its pump 70, of this invention, including their components, are preferably manufactured of steel, steel alloys, or more preferably, stainless steel. The insulation 102 and 79 may be any suitable dielectric (e.g. foam) that prevents heat transfer into the atmosphere. The pulsator 90, including its components except the diaphragm 120, are also preferably manufactured of steel, steel alloys, or more preferably, stainless steel. The diaphragm 120 may be any suitable elastic member capable of performing its desired function. Preferably, diaphragm 120 is manufactured of a components from the rubber family, such as neoprene. The diaphragm conduit 122, the by-pass conduit 128, the flow-control valve 134, the vneturi nozzle 126 and the diaphragm valve 124, are also preferably manufactured of the same material as the pulsator 90, which is preferably stainless steel.

The absorber spray head 56 used in the absorber 54 is preferably made of stainless steel and provides an extremely soft and uniform mist at a low pressure. This design increases the life of the absorber 54 and reduces any erosion that might occur at the top of the absorber coil 62. This soft fog like mist also improves the efficiency of the cycle due to elimination of temperature variation in any heat exchangers.

My invention will be illustrated by the following set forth example which is given by way of illustration and not by any limitation. All parameters such as temperatures, pressures, rates, fluids, etc. submitted in the example are not to be construed to unduly limit the scope of my invention.

EXAMPLE I

A generator reservoir 20 and an absorber reservoir 68 have a chemical refrigerant comprising 45 to 75 wt. % of lithium bromide in water. Water, as generator fluid, is fed from the heat source means 225 at a temperature of 185° F. through the entrance conduit 24, the pump conduit coil 25, and into inlet 108 of the coil 106 of pump 70 for a circuitous path initially around the second chamber 80 and subsequently around the first chamber 78. The generator fluid water leaves the outlet 110 of the coil 108 at approximately 183° F. and passes into the generator coil 22.

As the water circuitously flows through the generator coil 22, water in the chemical refrigerant evaporates at a rate of between about 20 to 35 lbs. per hour. Essentially no lithium bromide evaporates. The water vapor flows around the inner spherical house 14 from convection and pressure differences, and contacts the condensor coil 34. The condensor coil 34 has a temperature of about 92° F. from condensor water that has left the absorber coil 62 through conduit 66. The water vapor condenses into the condensor pan 32 at a rate of between about 20 to 35 lbs per hour. The condensate in the condensor pan 32 is at a temperature of about 105° F., and the pressure in the condensor 30 is approximately 50 mm Hg absolute pressure. Condensate leaves the condensor pan 32 through conduit 44 for passage into the evaporator pan 42 of the the evaporator 40.

Water at a temperature of about 54° F. leaves the cooling coil means 51 and passes into the evaporator coils 48 of the evaporator 40. The pressure in the atmosphere evaporator 40 is about 6 mm Hg absolute pressure. As condensate flows from the condensor pan 32 into the evaporator pan 42 it contacts the evaporator coils 48 possessing about 54° F. water, the condensate water boils, taking heat from the 54° F. water, which lowers the temperature of the latter to about 40° F. Water at 40° F. leaves the evaporator coil 48 through conduit 52 to return back to the cooling coil means 51 for eventual use by a user.

The temperature of the water vapor leaving the evaporator pan 42 is approximately 39° F. The vapor descends into the absorber 54. The absorber spray head 56 sprays a concentrated solution of the lithium bromide-water refrigerant solution onto the descending condensate water vapor. The absorber spray head 56 emits the concentrated lithium bromide-water at a rate of between about 30-72 gallons per hour. The lithium bromide-water spray absorbs the water vapor. This absorption generates heat which is removed from the absorption coil 62 having water at about 82° F. entering the absorption coil 62 from the cooling tower means 39 through the conduit 64. The lithium bromide-water solution including absorbed water condensate collects in the bottom of the inner spherical house 14 of the absorber reservoir 68.

The absorber reservoir refrigerant 68 is flowed down the inlet 74 through the first chamber 78 (and its accompanying back pressure valves) into the second chamber 80 until the equalization of pressure between the second chamber 80 and the reservoir conduit 75 stops the flow of the chemical refrigerant. The pressure in the atmosphere of the reservoir 68 is a vacuum possessing about 6 mm Hg of positive pressure. The pressure in the reservoir conduit 75 (and the generator reservoir 68) is a vacuum possessing about 55 mm Hg of positive pressure. The first and the second chambers 78 and 80, respectively, has a 0.50 inch ID. The respective lengths of each chamber is 1.44 inches. As previously mentioned the generator fluid is water, and is introduced into the inlet 105 of the coil 106 (with a 0.5 in. OD) at a temperature of about 185° F. to begin a circuitous path through the coil 106 and initially around the second chamber 80 and subsequently around the first chamber 78. The pulsator 90 is adjusted to pulse at a rate of 90 pulses/min. with the adjustment of the flow rate through diaphragm conduit 122, the by-pass conduit 128, the venturi nozzle 126, and the setting of the flow-control valve 134, accordingly.

The diaphragm conduit 122 and the by-pass conduit 128 has a 1 in. OD. The venturi nozzle 126 has an inner orifice of 0.12 in. and an outer orifice of 0.25 in. Port 114 is 0.125 in. ID. U-shaped passageway 125 is approximately 0.4 in. in width and 0.125 in. in depth. Two pairs of diverging openings 133—133 are utilized with each opening having a 0.125 in. ID. The valve ball 129 is 0.344 in. OD. The diaphragm housing 88 is elliptically 6 ins. in width and 3 ins. in depth. The conduit 86 leading from the diaphragm housing 88 to the first chamber 78 is 0.21 in. ID.

With a pulsation effect on the first chamber 78 from the neoprene diaphragm 120 pulsing at 30 pulses/min., in combination with the percolation of the chemical refrigerant solution in the first and second chambers 78 and 80, respectively, the pump 70 pumps the chemical refrigerant solution at a rate of 12 gals./min. from the reservoir 68 into the reservoir conduit 75 and into the generator reservoir 20.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. An absorbent-refrigerant solution comprising a major proportion of water and a minor proportion of a transition metal halide comprising titanium trifluoride and titanium tetrafluoride in a ratio of from about 1:9 to about 9:1 by weight.

2. An absorbent-refrigerant solution comprising a refrigerant compound and a transition metal halide comprising titanium trifluoride and titanium tetrafluoride in a ratio of from about 1:9 to about 9:1 by weight.

3. The absorbent-refrigerant solution of claim 2 wherein said refrigerant compound is an alkali metal halide; and said absorbent-refrigerant solution additionally comprises water.

4. The absorbent-refrigerant solution of claim 3 comprising from about 5% by weight to about 60% by weight of said alkali metal halide, from about 40% by weight to about 95% by weight of said water, and from about $10^{-8}$% by weight to about 0.10% by weight of said transition metal halide.

5. The absorbent-refrigerant solution of claim 4 wherein said alkali metal halide is lithium bromide, and said transition metal halide is selected from the group consisting of titanium trifluoride, titanium tetrafluoride, and mixtures thereof.

6. The absorbent-refrigerant solution of claim 2 additionally comprising a surfactant to reduce surface tension.

7. The absorbent-refrigerant solution of claim 6 comprising from about 1% by weight to about 40% by weight of said alkali metal halide, from about 55% by weight to about 94% by weight of said water, from about $10^{-8}$% by weight to about 0.10% by weight of said transition metal halide, and from about 0.1% by weight to about 5% by weight of said surfactant.

8. The absorbent-refrigerant of claim 7 wherein is an alcohol.

9. The absorbent-refrigerant of claim 8 wherein said surfactant is octyl alcohol.

10. The absorbent-refrigerant solution of claim 6 additionally comprising an antifreezing agent.

11. The absorbent-refrigerant solution of claim 10 additionally comprising a corrosion inhibitor.

12. The absorbent-refrigerant solution of claim 10 comprising from about 0.5% by weight to about 70% by weight of said alkali metal halide, from about 20% by weight to about 95% by weight of said water, from about $10^{-8}$% by weight to about 0.10% by weight of said transition metal halide, from about 0.1% by weight to about 5% by weight of said surfactant, and from about 0.1% by weight to about 5% by weight of said antifreezing agent.

13. The absorbent-refrigerant solution of claim 12 wherein said surfactant is an alcohol; and said antifreezing agent is an alcohol.

14. The absorbent-refrigerant solution of claim 13 wherein said surfactant is octyl alcohol, and said antifreezing agent is ethyl alcohol.

15. A promoter for enhancing the vapor absorbent properties of an absorbent-refrigerant solution comprising from about 10% by weight to about 90% by weight of titanium trifluoride and, correspondingly, from about 90% by weight to about 10% by weight of titanium tetrafluoride.

16. The promoter of claim 15 comprising about 40% by weight titanium tetrafluoride and about 60% by weight titanium trifluoride.

* * * * *